(12) United States Patent
Martinka et al.

(10) Patent No.: US 8,881,164 B2
(45) Date of Patent: Nov. 4, 2014

(54) COMPUTER PROCESS WITH UTILIZATION REDUCTION

(75) Inventors: Joseph J Martinka, Sunnyvale, CA (US); Cedric T. Bianchi, Mountain View, CA (US); Charles M Voelkel, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/275,464

(22) Filed: Oct. 18, 2011

(65) Prior Publication Data
US 2013/0097605 A1    Apr. 18, 2013

(51) Int. Cl.
| G06F 9/46 | (2006.01) |
| G06F 12/00 | (2006.01) |
| G06F 9/48 | (2006.01) |
| G06F 12/02 | (2006.01) |
| G06F 9/50 | (2006.01) |

(52) U.S. Cl.
CPC ............ G06F 9/485 (2013.01); G06F 12/0276 (2013.01); G06F 9/5011 (2013.01); Y02B 60/142 (2013.01)
USPC .......................................... 718/104; 707/819

(58) Field of Classification Search
CPC ..... G06F 9/5066; G06F 9/50; G06F 12/0276; G06F 9/5011; Y02B 60/142

USPC ............................................ 718/104; 707/819
See application file for complete search history.

(56) References Cited

U.S. PATENT DOCUMENTS

| 6,078,955 A * | 6/2000 | Konno et al. ............... 709/224 |
| 6,253,215 B1 * | 6/2001 | Agesen et al. ............. 1/1 |
| 6,496,864 B1 * | 12/2002 | McCartney ................ 709/226 |
| 6,711,739 B1 * | 3/2004 | Kutcher ...................... 718/1 |
| 7,636,918 B2 | 12/2009 | Kadashevich |
| 7,716,643 B2 * | 5/2010 | Goldin ........................ 717/124 |
| 7,886,302 B2 | 2/2011 | Kadashevich |
| 2006/0224728 A1 * | 10/2006 | Baba .......................... 709/224 |
| 2007/0294695 A1 * | 12/2007 | Jensen et al. .............. 718/102 |
| 2010/0269122 A1 * | 10/2010 | Malinowski et al. ...... 719/317 |
| 2011/0035492 A1 | 2/2011 | Miyakawa |
| 2011/0145393 A1 | 6/2011 | Ben-Zvi et al. |
| 2013/0201877 A1 * | 8/2013 | Kung et al. ................ 370/255 |

FOREIGN PATENT DOCUMENTS

JP    2001265643 A    9/2001

* cited by examiner

Primary Examiner — Camquy Truong

(57) ABSTRACT

A system includes computer-readable storage media encoded with code defining a computer process. The computer process is configured to monitor its own resource utilization so that it can detect a resource-utilization condition. In response to a detection of the utilization condition, the computer process causes its own resource utilization to be reduced.

7 Claims, 4 Drawing Sheets

COMPUTER PROCESS WITH UTILIZATION REDUCTION

BACKGROUND

A "computer process" is a computer activity defined by executing a computer program. A computer program is a physical encoding in non-transitory computer-readable storage media of computer-readable data including computer-executable instructions. A computer program can be executed using computer hardware, e.g., a computer processor.

"Computer process" encompasses both foreground and background processes. A foreground process is a process of which a user is normally aware, e.g., because it presents a user with a perceived (e.g., graphical or text-based) user interface for user inputs and/or outputs. Background processes operate without a perceived user interface, e.g., because there is no user interface or because a provided user interface is employed only rarely, e.g., for configuration purposes. Browsers typically provide for foreground processes that allow a user to interact with web sites. Examples of background processes include processes that monitor the activity and usage of programs and devices. For example, a background process may be used to monitor use of a webcam that is part of or is connected to a computer on which the background process is executing.

BRIEF DESCRIPTION OF THE DRAWINGS

The following figures represent examples and not the invention itself.

DETAILED DESCRIPTION

Computer processes may cause computer resources to be improperly allocated or improperly retained by the computer process. A method to increase the available resources can include monitoring by a computer process its own resource utilization so that it can detect a resource-utilization condition. In response to a detection of said resource-utilization condition the computer process resource utilization can be reduced.

Figure 1:
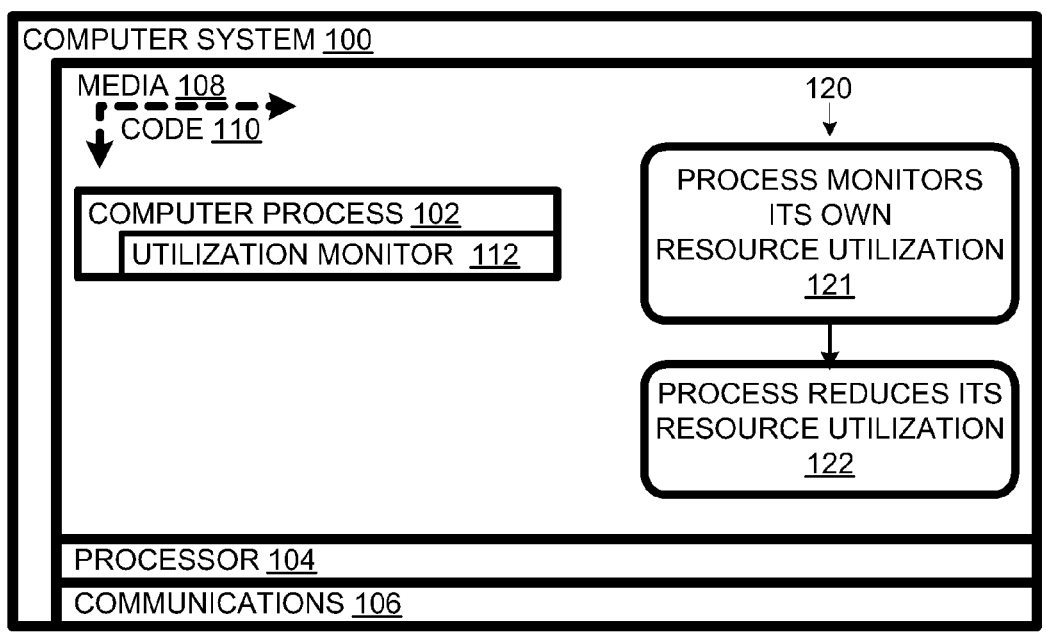
FIG. 1 is a schematic diagram of a computer system in accordance with an example.

In a computer system 100, shown in FIG. 1, a computer process 102 detects a resource-utilization condition and, in response, causes its resource utilization to be reduced. As a result, computer process 102 can maintain a small footprint (relatively low level of resource utilization) despite a tendency for resource utilization to increase over time, e.g., due to memory leakage.

Computer system 100 includes hardware such as processor 104, communications devices 106, and computer-readable storage media 108. Media 108 is encoded with code 110 defining computer process 102, as well as actions 120. Computer process 102 includes a resource-utilization monitor 112 for monitoring resource utilization by computer process 102 so that a resource-utilization condition can be detected. In method 120, at 121, process 102 monitors its own resource utilization so as to be able to detect the resource-utilization condition. At 122, in response to a detection of the resource-utilization condition, process 102 causes its resource utilization to be reduced.

Herein, "resource utilization" refers to an absolute or proportional amount of computing resources consumed by a subject, which, in this present context, is the subject computer process. "Computing resources" can include hardware resources, e.g., processors, memory and other storage media, and communications (including input-output) devices, as well as non-hardware resources such as programs and licenses associated with the use of hardware and/or software. Herein, "resource-utilization monitor" refers to a subprocess of a computer process that monitors resource utilization; in the present context, that utilization is at least in part by the computer process itself.

Herein, a "resource-utilization condition" is a condition based at least in part on resource-utilization data, e.g., obtained by utilization monitor 112. Non-limiting examples of such conditions include: proportional processor utilization exceeding a threshold; absolute memory capacity utilization exceeding a threshold; software license fees rising above a budgetary threshold; and outgoing communications bandwidth consumption exceeding a bandwidth threshold.

While the foregoing examples involve exceeding utilization thresholds, some examples involve falling below thresholds. For example, a low incoming communications bandwidth utilization may indicate that a user (human or automated) has less or no further use for the computer process; accordingly, the mission activity of the computer process can be reduced (e.g., it performs its mission with a lower frequency) or temporarily or permanently terminated.

A computer process can cause its own resource utilization to be reduced in a number of ways. For example, a process can suspend some or all of its activities. For example, a process designed to monitor other programs, processes, or devices can suspend monitoring and/or suspend reporting the results of the monitoring. In extreme cases, a process can suspend all of its mission-related activities and enter "hibernation" (in which activity can be limited to whatever procedure is to be used to awake from hibernation).

In some cases, however, suspension and hibernation may not provide a sufficient reduction in resource utilization. For example, an operating system may fail to reclaim resources not used by the process. Thus, the resources may remain idle rather than being made available to other processes. In such cases, a computer process may be able to force the operating system to reclaim resources by causing itself to be terminated. However, there remains a challenge to restart a terminated process (e.g., once its resources have been reclaimed).

Figure 2:
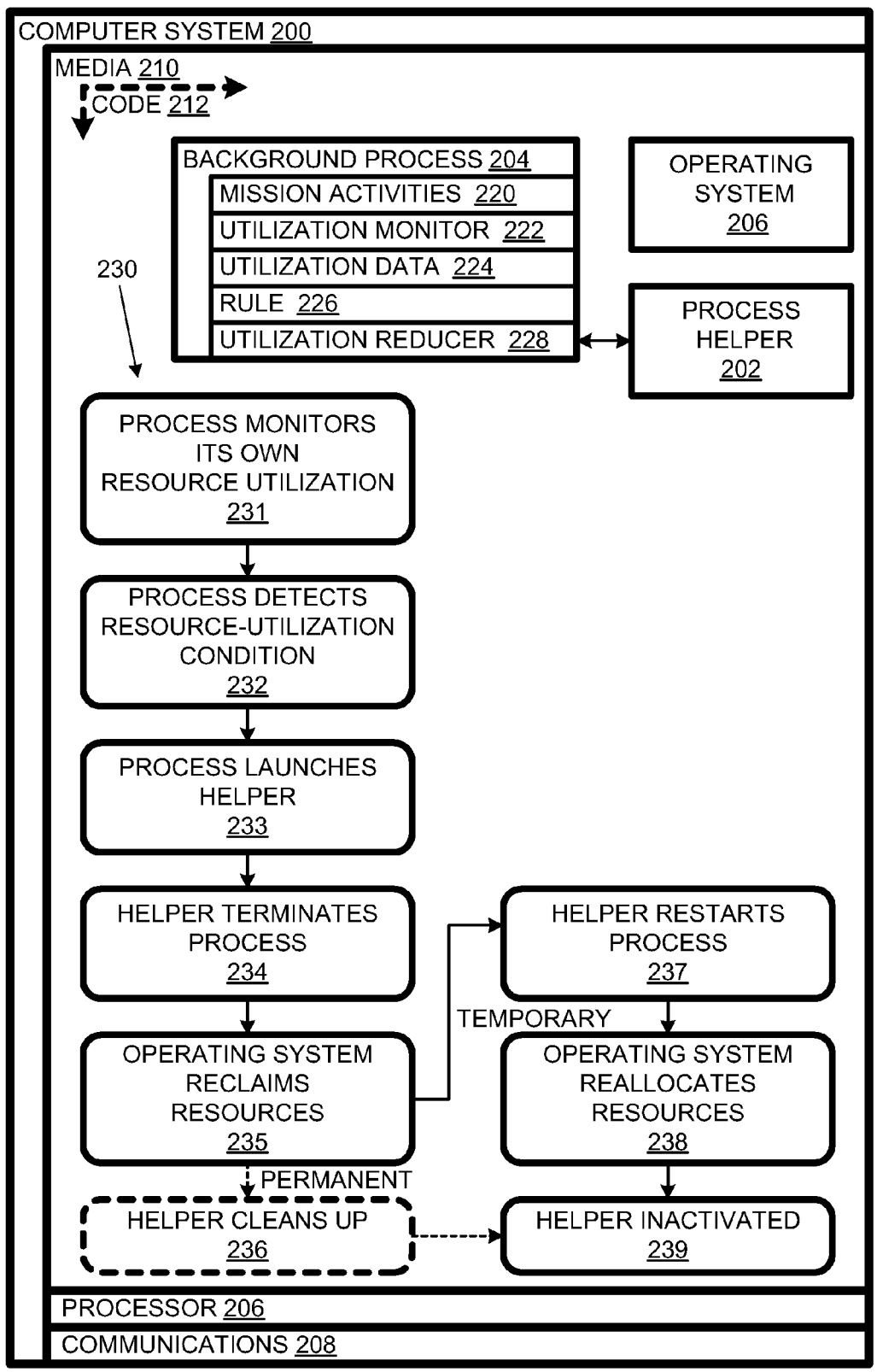
FIG. 2 is a schematic diagram of a computer system including a process helper in accordance with an example.

To address this challenge, a computer system 200, shown in FIG. 2, includes a process helper 202 that can perform tasks relating to a background process 204 while it is inactive (e.g., because background process 204 has been terminated). Computer system 200 includes hardware, e.g., a processor 206, communications (e.g., human and network interface) devices 208, and computer-readable storage media 210. Media 210 is encoded with code 212 defining process helper 202, background process 204, and an operating system 206. Process helper 202 and background process 204 may run on or be part of operating system 206.

Background process 204 includes mission activities 220, utilization monitor 222, utilization data 224, at least one rule 226, and a utilization reducer 228. Herein, "mission activities" includes activities that further a process's purpose or mission and excludes activities related to reducing resource-utilization by the process. For example, the monitoring by utilization monitor 222 of the process' own resource utilization and action taken by utilization reducer 228 to reduce the process' own resource utilization are not considered "mission activities".

Rule 226 associates a utilization condition with an action to be taken in response to detection of that utilization condition. Rule 226 can be complex in the sense that it can specify different actions to be taken in response to different termination conditions. Alternatively, rule 226 can be considered a set of sub-rules associating actions with termination conditions. Each termination condition is based at least in part on utilization data 224 collected by utilization monitor 222.

For example, background process 204 (and, thus, rule 226) can be self-adjusting to initial memory utilization and target configuration loads. Upon startup, a warm-up period, e.g., of 30 seconds, passes before background process 204 records its current memory working set after a forced memory "garbage collection". Background process 204 then sets two configurable limits, e.g., at 150% and 300% respectively of the working set. This self-adjusting procedure is meant to handle different configurations or binary releases without interference.

Periodically, e.g., after every fifty process stop events, the memory is checked against the first limit. If the first limit is exceeded, a "mild" action may be taken to disconnect from the operating-system management interface, and force garbage collection and other programmatic memory reclamation functions. The limit can be reset upwards, e.g., by 30%.

If the second target is reached, "radical" action may be taken. For example, radical actions can consist of agent-destruction and rebirth using an external helper program to assist in a service orderly suspension, shutdown and restart to allow operating-system mechanisms to release defunct library objects. Prior to exit, background process 204 can store its current state in an orderly fashion. Background process 204 then runs process helper 202, which terminates background process 204, waits some period, e.g., 30-60 seconds, and then restarts background process 204. On restart, the current process state is retrieved with minimal loss, including a scan of the process list to discover any new processes that had started during the radical action. As a result of the restart, background process 204 returns to minimum memory usage.

When executed, code 212 further provides for a method 230, flow charted in FIG. 2. At 231, a process (e.g., computer process 204) monitors (e.g., using utilization monitor 222) resource utilization so as to generate utilization data 224. At 232, process 204 detects a utilization condition, e.g., by finding a rule 226 having an associated utilization condition that matches the current utilization data 224. Rule 226 specifies the action to be taken in response to the utilization condition. For at least one condition, the action involves launching process helper 202 and specifying to process helper 202 what actions it is to take.

At 233, background process 204 launches a process helper, e.g., helper 202. The launch may specify switches or arguments that inform the helper what actions it is to take. At 234, helper 202 terminates process 204. In response to this termination, operating system 206 reclaims a first amount of resources from process 204. In the event the termination is to be temporary, after some time, but usually within a minute after termination, helper 202 restarts process 204. At 205, in response to the restart, operating system 206 allocates resources to process 204; the amount of resources allocated may be less than the amount reclaimed so that the net effect is a reduction in the amount of resources utilized by process 204 under comparable conditions. Once process 204 is restarted, helper 202 can be inactivated (e.g., terminated).

In some cases, a rule calls for permanent termination of a computer process. In such a case, the appropriate course of action is indicated to process helper 202 upon launch at 233. Where a permanent termination is intended, actions 230 proceeds from 235 to 236 (instead of 237), at which helper 202 "cleans up", e.g., removes double and dangling memory-location references, and, in some cases, removes files, with respect to process 204. Once clean-up is completed, helper 202 can inactivate itself at 239.

Self-monitoring processes can be useful for limiting resource utilization by processes having missions that benefit the user at most indirectly. For example, a computer vendor may bundle hardware (e.g., a webcam) and software (e.g., a browser) to differentiate their computers from those of the vendor's competitors. However, since there may be a cost associated with each bundled item, the vendor may wish to carefully select what to bundle in and what not to.

One way to obtain valid information on which to make bundling decisions is to include one or more usage monitors that keep track of which programs and devices are used and to what extent. Such programs can be designed to provide usage data to a vendor or a service provider for market purposes. Such usage monitors may run continuously as a service.

Since such monitors consume resources and since they may provide little or no perceived value to a user, a user may be disinclined to allow a usage monitor to execute. In some cases, users are motivated to altogether remove programs that are seen as consuming resources without providing a concomitant value in return. Accordingly, usage monitors, if they are to be used in enough cases to provide helpful marketing information, must be unobtrusive and consume as few resources as possible.

However, even a well-designed process, e.g., one with a small "footprint", may consume more resources over time due to the way it is handled by an operating system. Some operating systems do not reallocate resources as effectively as possible so that resource usage can gradually increase beyond a program's actual requirements. For example, the amount of memory allocated to a process can increase over time due to "memory leakage". Stopping and restarting a usage monitor or other process can allow an operating system to reclaim all resources allocated to the process and then allocate only an appropriate amount of resources once the process is restarted.

Figure 3:
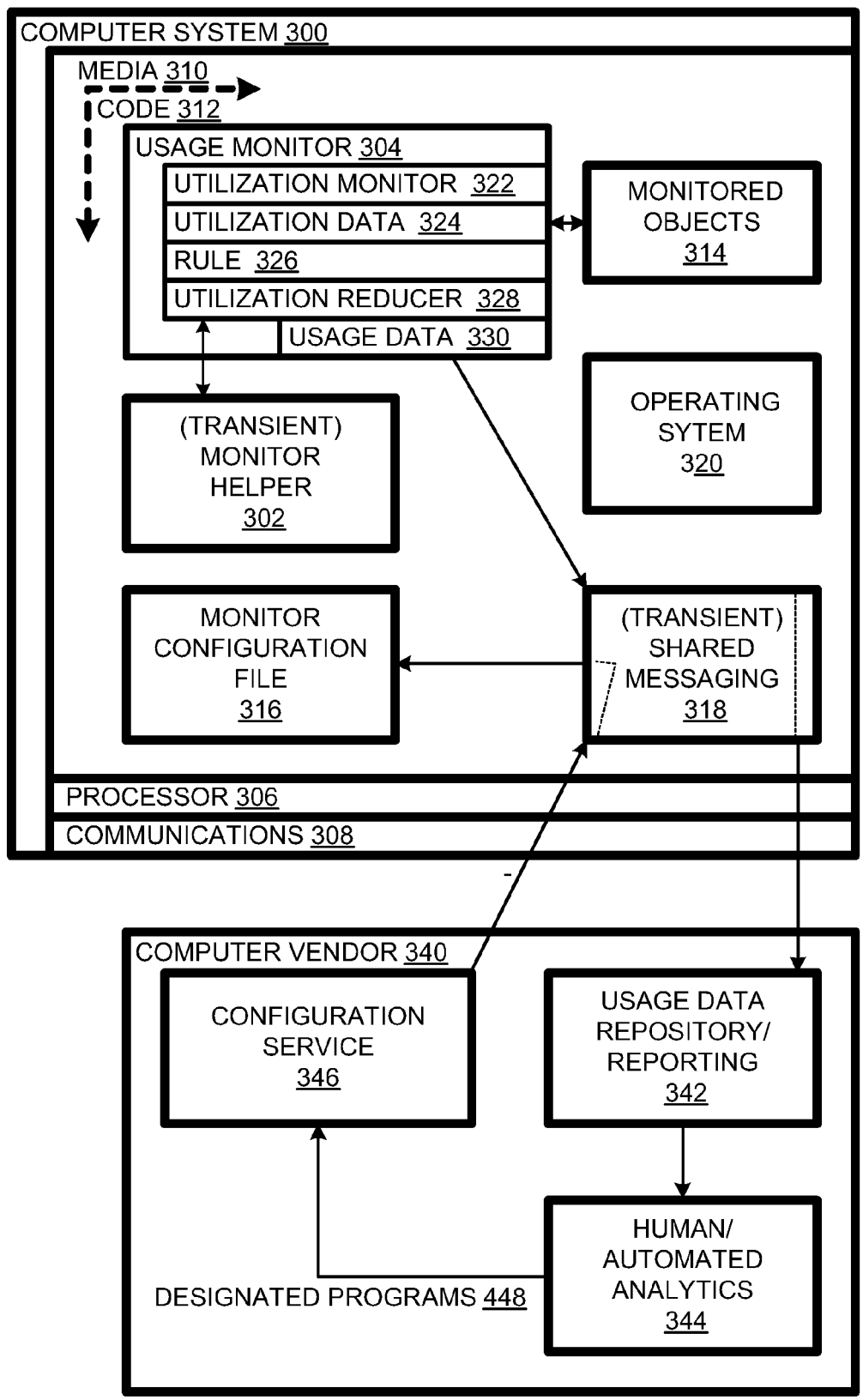
FIG. 3 is a schematic diagram of a computer system and a computer vendor in accordance with another example.

In the case of a computer system 300, shown in FIG. 3, a monitor-helper 302 assists in terminating a computer program usage monitor 304. Computer system 300 includes a processor 306, communications devices 308, and non-transitory computer-readable media 310. Media 310 is encoded with code 312 that defines monitored objects 314, usage monitor 304, monitor helper 302, a monitor configuration file 316, a shared messaging process 318, and operating system 320. Usage monitor 304 includes a utilization monitor 322 for monitoring its own resource utilization, utilization data 324 resulting from the utilization monitoring, rule 326 identifying a utilization condition and a corresponding action to be taken, a utilization reducer 328 for taking the corresponding action, and usage data 330 resulting from the mission activity of usage monitor 304.

During normal operation, a user may start, run, and stop various ones of monitored objects 314, e.g., program or device. Monitored objects 314 may include devices, e.g., a webcam, and/or free, paid, and trial programs. Examples of free programs may include a media player, a proprietary program launcher, and a browser. Examples of trial versions of programs may include commercial antivirus, business productivity, and media (picture and video) manipulation programs.

When active, usage monitor 304 detects each start and each stop of each monitored object 314. In addition, usage monitor 304 tracks resource utilization, e.g., processor, memory, and communications bandwidth utilization, for each monitored object 314. In addition, usage monitor 304 can monitor other parameters for monitored objects. For example, usage monitor 304 can determine whether a trial program has been used to make a purchase of a full version of the program.

To minimize the impact on resources, usage data 330 can be limited to core metrics. The data collected can be subject to rolling summarization so that the amount of resource consumed at any one time is minimized. Periodically, or upon request, summarized usage data 330 is communicated via shared messaging process 318 to a computer vendor 340.

Computer vendor 340 includes a usage data repository 342, an analytics engine 344, and a configuration service 346. Data repository 342 stores the data received from system 300 and from comparable systems. Usage data repository 342 reports data to analytics engine 344, which can be automated and/or human assisted. Analytics engine 344 evaluates usage across users of individual programs. These results are used as a basis for determining what computing objects to monitor in future monitoring intervals.

The identities of the objects 314 to be monitored in a next monitoring period are communicated to configuration service 346. Configuration service 346 provides data for configuration file 316 via shared messaging process 318. Configuration file 302 lists which monitored objects 314 are monitored by usage monitor 304.

At the beginning of a fresh monitoring period, e.g., 7 or 30 days, usage monitor 304 requests an updated configuration, including in its request the characteristics of the device (e.g. country, model, agent version, operating-system type, sales cycle). Configuration service 346 returns a list of target objects to track that meet the requested characteristics. This allows computer vendor 340 to customize which computing objects are tracked by any of these characteristics.

During a monitoring period, usage monitor 304 can be activated by an event for each process start and stop. For those objects that are to be monitored, at a process stop, the agent records resource utilization, e.g., the total CPU time expended. Any process that exits immediately after launch can be discarded as an accidental launch. At the end of the period, usage monitor 304 checks if the monitored objects are still installed or enabled, wraps accumulated statistics, and queues them for eventual delivery to computer vendor 340 using shared messaging 318.

In this exemplar case, since pertinent events only occur when a monitored object 314 stops, there is no reason to schedule any other event for housekeeping, or to close out a measurement period. The additional overhead of timer-based polls can be completely eliminated from the agent as events driven from the sporadic but inevitable process start events can serve as a pseudo-clock tick. Tick counts support work rate-adjustable persistence and self-monitoring. Based on the multi-variable reports and changes in the market conditions, analysis engine 344 may change or add to the targets that usage monitor 304 will use for the following period's reporting.

Figure 4:
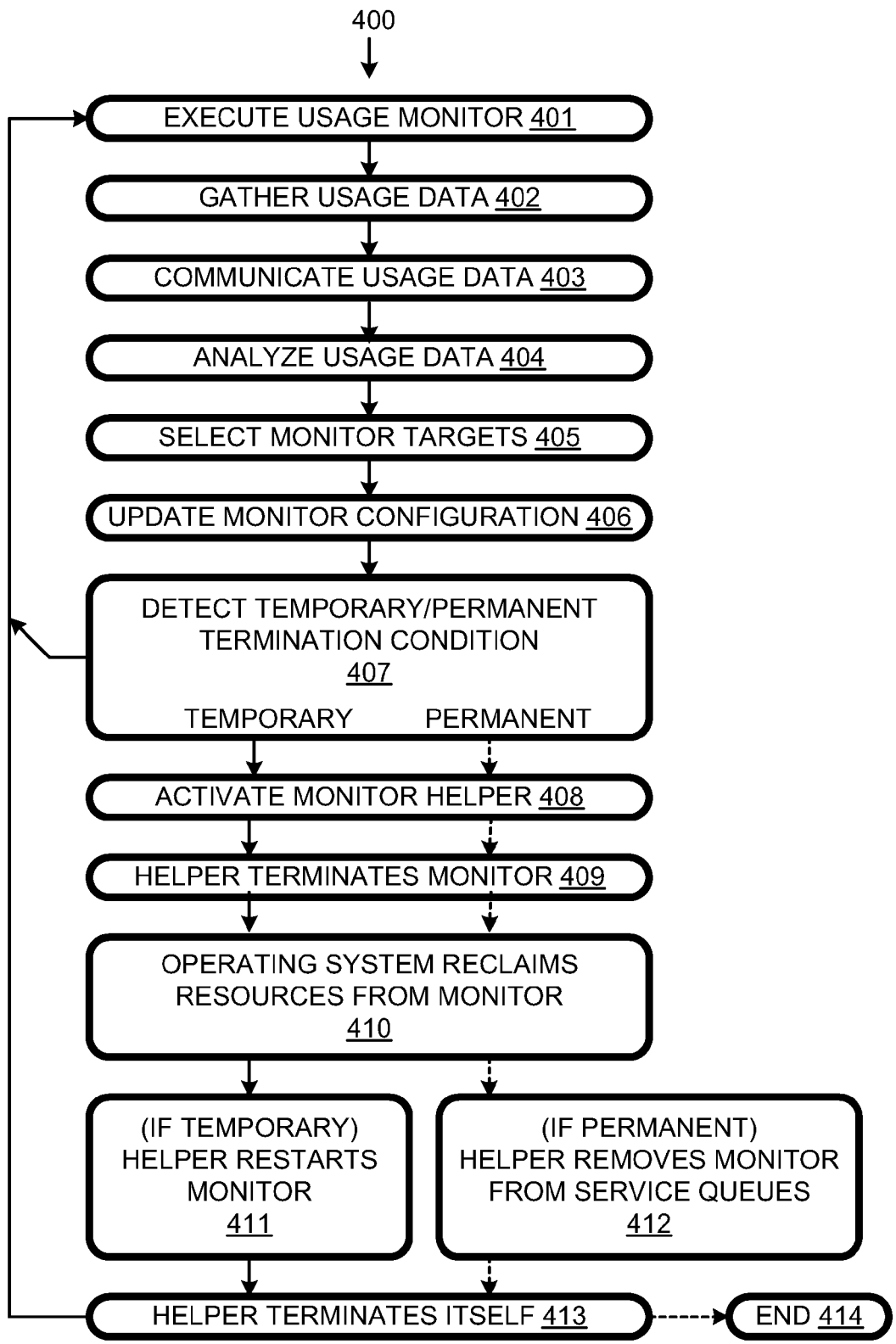
FIG. 4 is a flow chart of a process implemented by the example computer system of FIG. 3.

Computer system 300 may implement a process 400, flow charted in FIG. 4. At 401, system 300 executes usage monitor 304. As usage monitor 304 executes, operating system 320 allocates resources to it. Due to memory leakage, e.g., poor "garbage collection", resource utilization by usage monitor 304 gradually becomes less efficient; this is a concern since usage monitor 304 runs continuously, perhaps weeks or months as appropriate for computer system 300.

At 402, usage monitor 304 gathers usage data. This can involve detecting when each monitored object 314 starts and when each monitored object stops. In addition, resource usage by each monitored object is tracked for the periods in which it is active (executing). Other parameters can be tracked as well.

As data is tracked, it can be summarized in a rolling manner. Raw data concerning start times, end times, and resource utilization can be summarized to yield average active times and average utilizations over plural intervals in which a monitored program is active. As an example, each agent reports the total CPU use (e.g., in micro-seconds) of every monitored application over the measurement period.

At 403, the summarized usage data is communicated to computer vendor 340 possibly using a shared messaging agent 318 to the usage data repository 342. Computer vendor 340 can be a computer manufacturer, a computer seller, and/or a service provider managing usage data for its client. Typically, computer vendor 340 collects usage data from a multitude of user/customers and corresponding usage monitors.

At 404, the usage data can be further reduced, e.g., statistically summarized across users. During data reduction at the usage data repository 342, the reported measures are aggregated as an average CPU use per user based on a set of selected dimensions. Self-adjusting histogram bins are to differentiate minor, average or major users of a particular program; the self-adjusting histogram bins using calculated subgroup means to suggest the distribution of use for each target software title. For example, criteria at 0%, 20%, and 200% of the groups average yields four bins. The numbers of individual users with cumulative CPU times that fall into these four bins can be counted. This approach preserves enough distributional information but reduced to smaller data sets to manage every reporting period to address business needs. It also self adjusts the bins automatically for different monitored program behavior.

Similarly, each report can have an integer report count metric that increments for each report period. A business purpose parameter can be used to flatten that distributional data early in the data reduction; business purpose can be used, for example, to help limit the distributional information to bins for any monitor's report. For example, the bins can correspond to: 1st month, 2nd month, 3rd month, 2nd quarter, and greater than six months.

The resulting analysis can be used to select monitor targets at 405. In other words, some programs or devices that were monitored might be monitored no longer, while monitoring might begin for other programs or devices that were not previously monitored. For example, one might stop monitoring a program that is no longer being considered for bundling, but start monitoring a newly promoted program to measure the impact of a recent intensive advertising campaign. At 406, usage monitor configuration file 316 (and usage configuration files for other user computer systems) can be updated to identify the computing objects to be monitored. Method segments 401-406 can be iterated.

At 407, a termination condition can be detected by usage monitor 304. Usage monitor 304 incorporates techniques of self-monitoring that draw inspiration in part from the biological cellular apoptosis, or "programmed death", choosing extinction or rebirth as conditions to ensure the best customer experience is maintained. Usage monitor 304 minimizes resource use and initiates self-corrective actions.

Separate conditions can apply to temporary versus permanent termination. For example, exceeding normal utilization levels by a large amount can serve as a temporary termination condition. Lack of communication from computer vendor 340 for an extended period of time can be equated with low bandwidth utilization. Thus, low bandwidth utilization can indicate that the mission of usage monitor 304 has decreased or disappeared. This, in turn, can call for a permanent termination condition.

Whether the condition calls for a temporary or permanent termination, usage monitor 304 activates monitor helper 302 (since usage monitor 304 needs external processes to stop, clean up, and restart itself) at 408. Monitor helper 302 then terminates usage monitor at 409. This gives operating system 320 a chance to reclaim resources from usage monitor 304 at 410.

If the condition detected at 407 calls for a temporary termination, then monitor helper 302 restarts usage monitor 304 at 411. This can happen as soon as operating system 320 has reclaimed resources or after some delay, typically less than a minute. Once usage monitor 304 has been activated, monitor helper 302 terminates itself and process 400 returns to 401.

If the condition detected at 407 calls for a permanent termination, then once usage monitor 304 is terminated at 409, helper 302 can terminate itself at 412. Monitor helper 302 completes the permanent disabling of the program monitor, e.g., by taking programmatic actions to remove usage monitor 304 from automatic service queues. Process 400 ends at 413. Operating system 319 can reclaim resources from usage monitor 304 either before or after monitor helper 302 terminates itself.

Usage monitor 304 uses operating-system services, e.g., events from a management interface for operating system 320. Some operating-system management interfaces leak memory under certain conditions. To address this problem, usage monitor 304 self-monitors its "health" and can employ both mild and radical actions that ameliorate memory consumption.

The apoptosis feature of usage monitor 304 can be used for intentional service shutdown. Once computer vendor 340 has no more use for usage monitor 304, computer vendor 340 can take explicit steps to shut it down. Usage monitor 304 can respond to the monthly configuration service instructions to suspend or to terminate operations. These instructions are passed to the agent using the same service that typically provides a new configuration for the next monitoring period.

Usage monitor 304 can assume: a run state, a suspend state, and an extinction state. The run state corresponds to normal operations during which usage monitor 304 monitors program usage. In the suspend state, information is not collected or transmitted to computer vendor 340. The suspend state is useful to temporarily ease the server load at computer vendor 340 of creating usage reports as well as minimizing agent resource use on computer system 300 for suspended periods. The terminate state involves taking action to notify computer vendor 340 one last time and then to remove itself from the run queue permanently.

In the event that computer vendor 320 neglects to explicitly terminate usage monitor 304, the self-termination feature of usage monitor 304 can relieve system 300 from having to allocate resources for usage monitoring. Usage monitor 304 may try to reach computer vendor 320 at the beginning of each measurement period, (e.g., 7 or 30 days) to get an updated configuration. If persistent, consecutive attempts to obtain updated configurations from computer configuration service 346 fail, usage monitor 304 may consider itself abandoned, try to send one last usage report, and then remove itself from any further startup queue on exit with the assistance of the monitor helper 302.

A set of process rules for this self-termination can include the following.

a) Start a new measurement period. While measuring, attempt to get a new configuration. Should a network configuration request succeed, and the configuration is identical to the previous one, the currently measured period will continue, else a fresh one based on the updated configuration starts anew.

b) Should a network configuration request fail (e.g. network outage), start a back off algorithm over a back-off period time, e.g., 32 hours, to attempt to connect. Continue the current measurement period.

c) If the back-off period expires without a configuration update, cease attempts to get a configuration, and complete the current measurement period with the old configuration. Report at the end of the period as expected.

d) Repeat steps a) through c) for at least three measurement periods. If a configuration update is not obtained after the third consecutive measurement period, and at least 90 days has elapsed since the last good configuration update, consider the service abandoned and shut down permanently.

Usage monitor 304 minimizes resource demands during normal operation while providing intuitive information about distributions even though potentially millions of individual usage reports are limited in volume and summarized within constraints. As an example, usage monitor 304 reports the total CPU use (in seconds) of every monitored application over the measurement period. Usage monitor 304 aggregates data over successive measurement periods as an average CPU use per user based on a set of selected dimensions.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to systems including non-transitory tangible material in or on which data is or can be encoded.

"Computer" herein refers to a hardware machine adapted for manipulating data in accordance with computer-executable instructions, which are a specialized form of data. "Computer system" refers to a computer or network of computers together with any installed software. "Program" herein refers to an arrangement of computer-executable instructions configured to perform some function or task. Herein, a "computer vendor" is a service provider or other entity that sells, licenses, or provides for sale computers or computer-related services.

A computer program may or may not be "installed" on a computer. An installed computer program may be active (executing) or inactive (not executing). "Termination" refers to changing a program's state from active to inactive, i.e., executing to non-executing. "Start" and "restart" refer to changing a program's state from inactive to active.

"Usage" denotes a parameter corresponding to an amount an object is used by a user (human or automated). "Program usage" refers to usage where the object being used is a computer program. "Utilization" refers to a parameter corresponding to an amount a resource is used. Herein, "utilization" is of hardware resources and the parameter can be an absolute amount (e.g., of memory) or a proportion (e.g., of processor cycles) of what is available. "Self-terminating" characterizes a program that can terminate itself or cause another entity to terminate the program.

Herein, a "background process" is a program of computer executable instructions configured so that the program launches automatically and executes continuously in the background, i.e., without a user interface. Examples of background processes include processes that monitor devices and programs. Examples of processes that are not background processes include application processes with user interfaces, e.g., foreground processes associated with word processors and browsers.

In this specification, related art is discussed for expository purposes. Related art labeled "prior art", if any, is admitted prior art. Related art not labeled "prior art" is not admitted prior art. In the claims, the word "comprising" (and not a colon) demarks the boundary between the claim preamble and the claim body. In the claims, a colon is used to demark a top-level list. In the claims, "said" implies explicit verbatim antecedent basis, while "the" implies implicit antecedent basis. For example, for "the center of a circle" indicates there is explicit antecedent basis for "circle" but not for "center"; in that case, there is implicit antecedent basis for "center" since every circle has a unique center. The illustrated and other described embodiments, as well as modifications thereto and variations thereupon are within the scope of the following claims.

What is claimed is:

1. A method comprising:
monitoring by a computer process its own resource utilization so that it can detect a resource-utilization condition;
in response to a detection of said resource-utilization condition, launching, by the computer process, a process helper that terminates and restarts the computer process;
reclaiming, by an operating system, a reclaimed amount of resources from said process once said process is terminated; and
in response to said restarting of said computer process, allocating by said operating system to said computer process an amount of resources not greater than said reclaimed amount.

2. A method as recited in claim 1 wherein said computer process is a background process without a currently perceivable user interface.

3. A system comprising computer-readable storage media encoded with code that, when executed by hardware, defines:
a computer process including a resource-utilization monitor to monitor resource utilization by said computer process so as to be able to detect a resource-utilization condition, said computer process, in response to a detection of said resource-utilization condition, launching a process helper that terminates and restarts the computer process, said process helper being configured to restart said computer process after terminating said computer process without said process helper being terminated between said terminating and said restarting; and
an operating system configured to:
in response to termination of said computer process, reclaim a reclaimed amount of resources from said computer process; and
in response to said restarting of said computer process, allocate less than said reclaimed amount of resources to said computer process.

4. A system as recited in claim 3 further comprising said hardware.

5. A system as recited in claim 3 wherein said computer process is a background process lacking a user interface.

6. A system as recited in claim 3 wherein said process helper performs clean-up operations in response to terminating said computer process and terminates itself once said clean-up operations are complete.

7. A system as recited in claim 3 wherein either said computer process or said process helper terminates said process helper in response to said restarting of said computer process.

* * * * *

UNITED STATES PATENT AND TRADEMARK OFFICE
CERTIFICATE OF CORRECTION

| | | |
|---|---|---|
| PATENT NO. | : 8,881,164 B2 | Page 1 of 1 |
| APPLICATION NO. | : 13/275464 | |
| DATED | : November 4, 2014 | |
| INVENTOR(S) | : Joseph J. Martinka et al. | |

It is certified that error appears in the above-identified patent and that said Letters Patent is hereby corrected as shown below:

On the title page, in the illustrative figure, reference numeral 320, line 2, delete "SYTEM" and insert -- SYSTEM --.

In the Drawings

On sheet 3 of 4, reference numeral 320, line 2, delete "SYTEM" and insert -- SYSTEM --, therefor.

Signed and Sealed this
Seventh Day of April, 2015

Michelle K. Lee
*Director of the United States Patent and Trademark Office*